United States Patent [19]

Miyazaki et al.

[11] Patent Number: 4,836,600
[45] Date of Patent: Jun. 6, 1989

[54] FLOOR STRUCTURE FOR MODULAR VEHICLE BODY

[75] Inventors: Kenichi Miyazaki, Sagamihara; Katsumi Nakamura, Fujisawa; Taro Hagiwara; Keizo Inoue, both of Sagamihara, all of Japan

[73] Assignee: Nissan Motor Co., Ltd., Yokohama, Japan

[21] Appl. No.: 184,566

[22] Filed: Apr. 21, 1988

[30] Foreign Application Priority Data

Apr. 21, 1987 [JP] Japan .................................. 62-98130
Apr. 30, 1987 [JP] Japan ................................. 62-107388

[51] Int. Cl.4 ............................................ B62D 25/20
[52] U.S. Cl. ...................... 296/197; 296/29; 296/204
[58] Field of Search ................ 296/204, 29, 30, 191, 296/187, 196, 197

[56] References Cited

U.S. PATENT DOCUMENTS

| 2,072,842 | 3/1937 | Trautvetter | 296/137 |
|---|---|---|---|
| 2,256,885 | 9/1941 | Bruss | 296/204 |
| 3,021,172 | 2/1962 | Fiala et al. | 296/28 |
| 3,022,105 | 2/1962 | Tjaarda | 296/28 |
| 3,202,451 | 8/1965 | Auger et al. | 296/204 |
| 3,326,599 | 6/1967 | Pashenee | 296/137 |
| 3,423,122 | 1/1969 | Wessells | 296/204 |
| 3,541,668 | 11/1970 | Wessels, III et al. | 29/469 |
| 4,457,555 | 7/1984 | Draper | 296/30 |
| 4,634,173 | 1/1987 | Aonuma et al. | 296/188 |
| 4,730,870 | 3/1988 | DeRees | 296/197 |
| 4,759,489 | 7/1988 | Pigott | 228/102 |

FOREIGN PATENT DOCUMENTS 59-114165  7/1984  Japan .

Primary Examiner—Johnny D. Cherry
Assistant Examiner—Brian Sells
Attorney, Agent, or Firm—Foley & Lardner, Schwartz, Jeffery, Schwaab, Mack, Blumenthal & Evans

[57] ABSTRACT

A front floor panel has at a lateral end thereof a first flange for joining with a body side assembly. A floor panel has a second flange for joining with the body side assembly of a modular vehicle body. The first and sond flanges are formed with first and second recesses, respectively. A patch plate is fitted in the first and second recesses to form a smooth continuous joining surface which is joined with the corresponding flange of the body side assembly by interposing therebetween sealant adhesive. The rear floor panel is nearly rectangular and has a continuous upstanding flange extending upwardly from the laterally opposed ends and the rear end thereof for joining with the body side assembly and another body side assembly and a rear end assemby of the modular vehicle body.

6 Claims, 6 Drawing Sheets

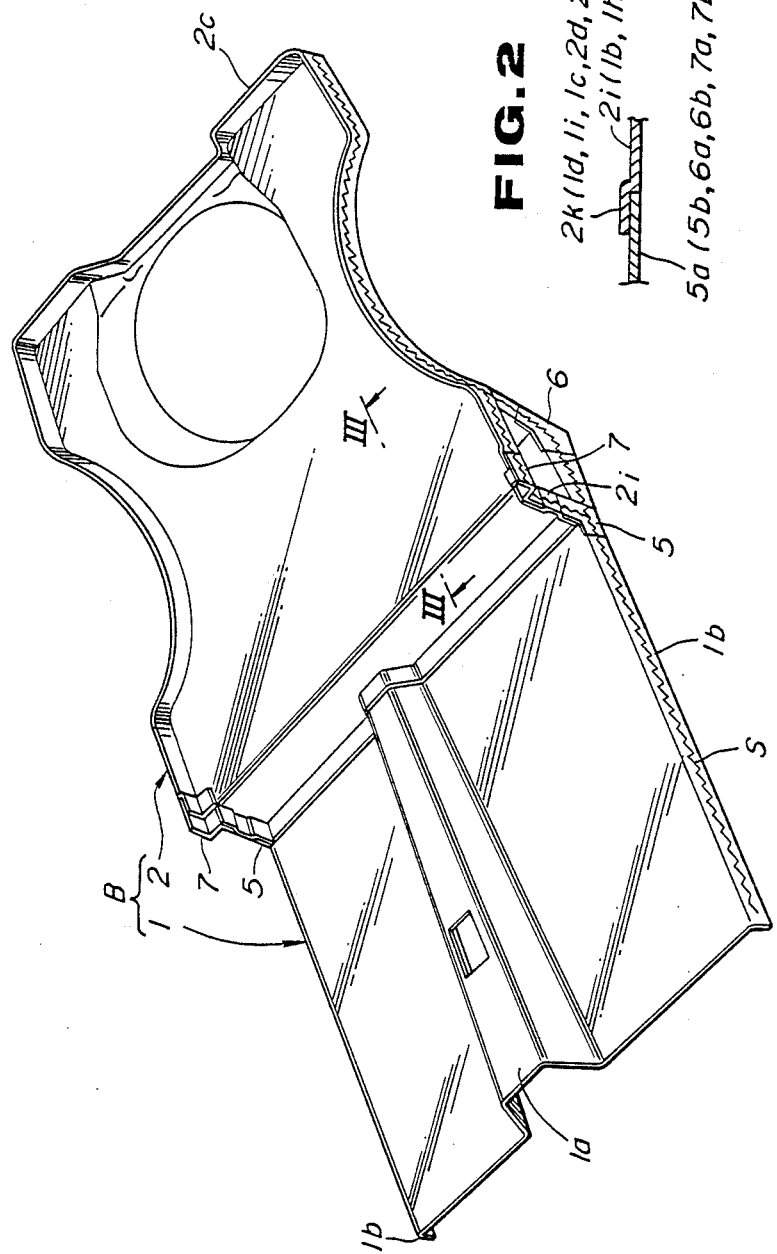
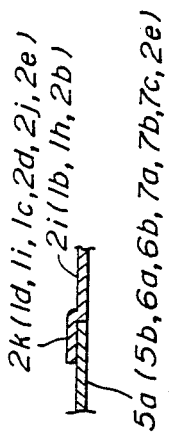

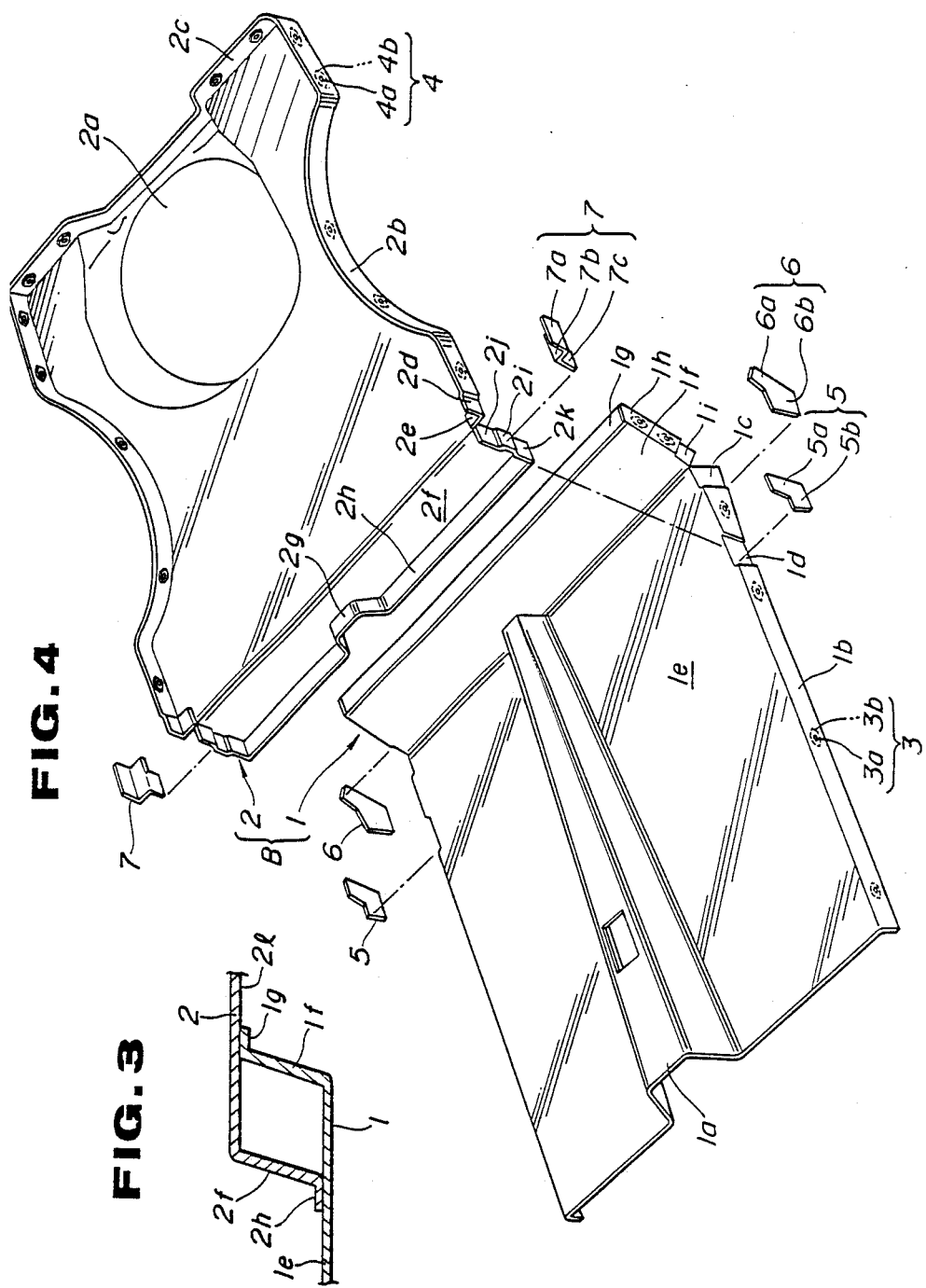

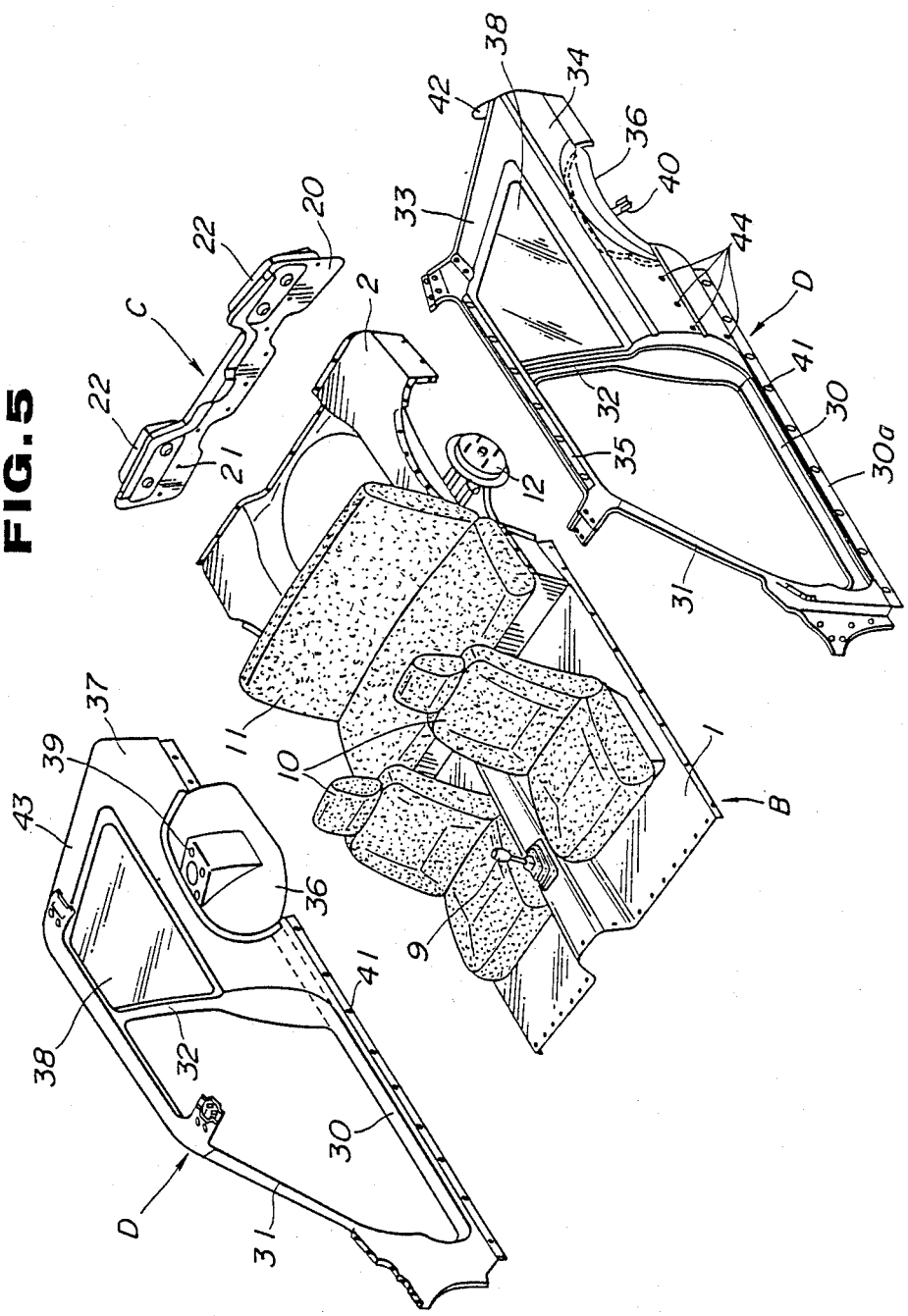

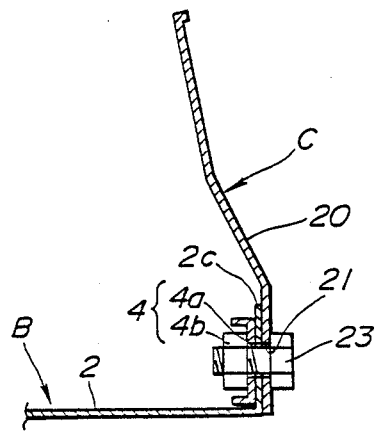
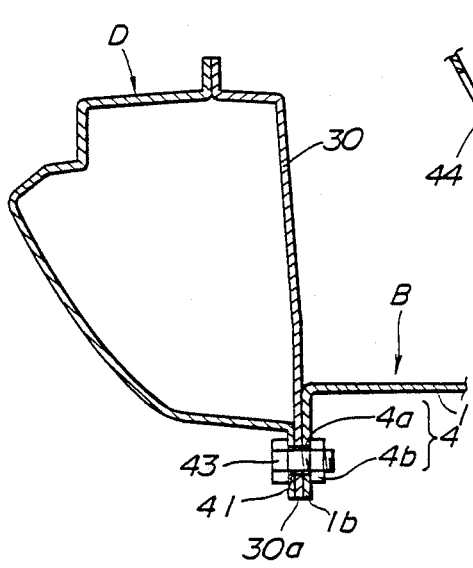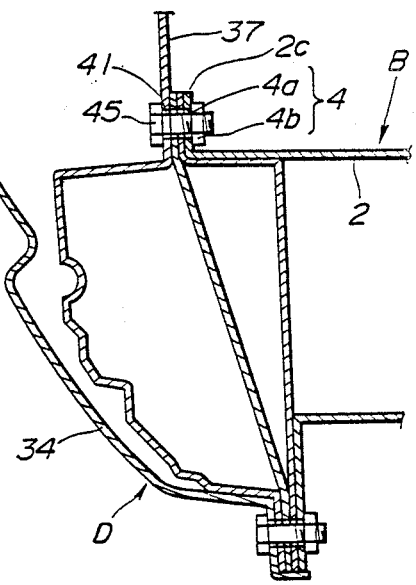

FLOOR STRUCTURE FOR MODULAR VEHICLE BODY

BACKGROUND OF THE INVENTION

1. Field of the Invention

The present invention relates in general to a modular vehicle body and more particularly to a floor structure for a modular vehicle body.

2. Description of the Prior Art

Unitized bodies have been used for many of automobiles, particularly for most passenger cars. The unitized bodies however have a difficulty in installation of components and inspection of same since access to the spaces for disposition of the components is obstructed by the body section enclosing the spaces.

A modular vehicle body is free from the above difficulty since it is constituted by a plurality of independent body sections which are joined together after being painted and furnished with respective equipments independently.

The modular vehicle body however has a difficulty in attaining an assured seal thereof as compared with the unitized vehicle body.

SUMMARY OF THE INVENTION

In accordance with the present invention, there is provided a novel and improved floor structure for a modular vehicle body.

The floor structure comprises a front floor panel having a first flange for joining with a body side assembly of the modular vehicle body, a rear floor panel having a second flange for joining with the body side assembly, and a patch plate extending between the first and second flanges to interconnect the same. The first and second flanges are formed with first and second recesses, respectively. The patch plate is fitted in the first and second recesses and cooperates with the first and second flanges to form a smooth, continuous joining surface.

The above structure is effective for overcoming the above noted difficulty inherent in the modular vehicle body.

It is accordingly an object of the present invention to provide a novel and improved roof structure for a modular vehicle body which makes it possible to attain an assured seal of the vehicle body with ease and efficiency.

It is another object of the present invention to provide a novel and improved roof structure which can reduce the manufacturing and assembling expense.

BRIEF DESCRIPTION OF THE DRAWINGS

FIG. 1 is a perspective view of a floor structure according to an embodiment of the present invention;

FIG. 2 is a sectional view of a joint portion of the floor structure of FIG. 1;

FIG. 3 is a sectional view taken along the line III—III of FIG. 1;

FIG. 4 is an exploded view of the floor structure of FIG. 1;

FIG. 5 is an exploded, perspective view of a modular vehicle body, though an engine compartment assembly, roof assembly, etc. are omitted, in which the floor structure of FIG. 1 is incorporated;

FIGS. 6 to 10 are sectional views taken along the line VI—VI, VII—VII, VIII—VIII, IX—IX and X—X of FIG. 11, respectively.

DETAILED DESCRIPTION OF THE PREFERRED EMBODIMENT

Figure 9:
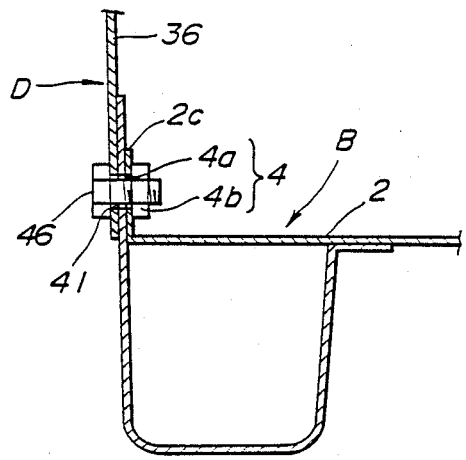

Referring to FIGS. 1 to 11, a modular vehicle body is constituted by a plurality of independent vehicle body sections, i.e., an engine compartment assembly A, floor assembly B. rear end assembly C, a pair of body side assemblies D and D and a roof assembly E. The assemblies are manufactured and assembled in their independent lines and then painted and equipped with devices components and upholsteries independently. After the assemblies are joined together to constitute a nearly complete vehicle body, an engine hood, windshield glass, front doors, back door, etc. are installed on the vehicle body though not shown in the drawing.

The floor assembly B mainly consists of a front floor panel 1 and a rear foor panel 2. The front floor panel 1 has at a laterally intermediate portion thereof a floor tunnel 1a protruding upwardly and elongated in the fore-and-aft direction of the vehicle body. The front floor panel 1 is nearly rectangular and has at the lateral end portions thereof, i.e., at the end portions opposed in the vehicle width direction, depending flanges 1b and 1b for connection with the body side assembly D and D. The flanges 1b and 1b each have a recess 1c at each rear end portion thereof and another recess 1d in the place spaced forwardly of the recess 1c. The recesses 1c and 1d are so formed as to have flat vertical outer surfaces receding laterally inwardly from the remaining flat vertical outer surface of the flange 1b. The front floor panel 1 has at the rear end thereof an upstanding rear end wall 1f extending upwardly and slightly rearwardly. The rear end wall 1f is elongated to extend throughout the width of the front floor panel 1 and has at the upper end thereof a flange 1g extending horizontally and rearwardly therefrom. The rear end wall 1f has at each lateral end thereof a flange 1h extending rearwardly and slightly downwardly therefrom and adapted for connection with the body side assembly D. The flange 1h has at the lower end portion thereof a recess 1i. The recess 1i is so formed as to have a flat vertical outer surface receding laterally inwardly from the remaining flat vertical outer surface of the flange 1h. The flanges 1b and 1h are formed with a plurality of threaded portions 3 in such a way as to have axes extending laterally of the vehicle body. Each threaded portion 3 consists of a bolt hole 3a formed in the flange 1b or 1h and a nut 3b welded to the inner surface of the flange 1b or 1h in such a way as to be aligned with the bolt hole 3a.

The rear floor panel 2 has at the rearward part thereof a downwardly recessed spare tire receiving portion 2a. The rear floor panel 2 further has at each lateral end thereof a part-circular cut 2b. The rear floor panel 2 has at the lateral ends, rear end and at the peripheries of the cuts 2b and 2b an upstanding flange 2c having a U-like configuration and adapted for connection with the body side assemblies D and D and the rear end assembly C. The flange 2c is formed by metal stamping or pressing so as to extend continuously around the nearly rectangular rear floor panel 2. The flange 2c is formed with a plurality of threaded portions 4 in such a way as to have axes extending laterally of the vehicle body. Each threaded portion 4 consists of a bolt hole 4a formed in the flange 2c and a nut 4b welded to the inner surface of the flange 2c in such a way as to be aligned with the bolt hole 4a. The flange 2c has at the laterally opposed front end portions thereof recesses 2d and 2d. Each recess 2d is so formed as to have a flat vertical outer surface receding laterally inwardly from the adjacent part of the flat vertical outer surface of the flange 2b.

The rear floor panel 2 has at the front end thereof a depending front end wall 2f having the same width as the front floor panel 1 and extending downwardly and slightly forwardly. The rear floor panel 2 is generally wider than the front end depending flange 2f and is formed at the laterally opposed front end portions thereof with recesses 2e and 2e. Each recess 2e is so formed as to have a flat horizontal outer surface 21 receding upwardly from the adjacent part of the lower surface 2l of the rear floor panel 2. The depending front end wall 2f is formed at the lower end thereof with a cut 2g adapted to fit on the tunnel portion 1a. A horizontal flange 2h is provided which extends horizontally and forwardly from the periphery of the cut 2g and the remaining lower end of the depending front end wall 2f. The depending front end wall 2f has at each lateral end thereof a flange 2i extending forwardly and slightly upwardly therefrom for connection with the body side assembly D. The flange 2i has at the upper and lower end portions thereof recesses 2j and 2k. The recesses 2j and 2k are so formed as to have flat vertical outer surfaces receding laterally inwardly from the remaining flat vertical outer surface of the flange 2i.

A patch plate 5 of an L-like configuration is provided which has an upper plate portion 5a and a lower plate portion 5b extending forwardly from the lower part of the upper plate portion 5a. The upper plate portion 5a is fitted in the recess 2k to be joined thereat with the flange 2i. The lower plate portion 5b is fitted in the recess 1d to be joined thereat with the flange 1b. When the patch plate 5 is fitted in the recesses 2k and 1d as above, the outer surface of the upper plate portion 5a becomes flush with the outer surface of the flange 2i whilst the outer surface of the lower plate portion 5b becomes flush with the outer surface of the flange 1b (refer to FIG. 2).

A patch plate 6 is provided which extends between the flanges 1b and 1h of the front floor panel 1 and has an upper plate portion 6a and a lower plate portion 6b extending forwardly from the lower part of the upper plate portion 6a. The upper plate portion 6a is fitted in the recess 1i. The lower plate portion 6b is fitted in the recess 1c. When the patch plate 6 is fitted in the recesses 1i and 1c as above, the outer surface of the upper plate portion 6a becomes flush with the outer surface of the flange 1h whilst the outer surface of the lower plate portion 6 becomes flush with the outer surface of the flange 1b (refer to FIG. 2).

A patch plate 7 is provided which extends between the flanges 2b and 2i of the rear floor panel 2 and has an upper upstanding plate portion 7a, a horizontal plate portion 7b extending laterally inwardly from the lower end of the upper upstanding plate portion 7a and a lower depending plate portion 7c depending from the inner end of the horizontal plate portion 7b so as to be offset or spaced laterally inwardly from the upper upstanding plate portion 7a. The upper plate portion 7a is fitted in the recess 2d to be joined thereat with the flange 2c. The horizontal plate portion 7b is fitted in the recess 2e to be joined thereat with the lower surface 2l of the rear floor panel 2. The lower plate portion 7b is fitted in the recess 2j to be joined thereat with the flange 2i. When the patch plate 7 is fitted in the recesses 2d, 2e and 2j as above, the outer surface of the upper plate portion 7a becomes flush with the outer surface of the flange 2b whilst the lower surface of the horizontal plate portion 7b becomes flush with the lower surface 2 of the rear floor panel 2 and the outer surface of the lower plate portion 7c becomes flush with the outer surface of the lower plate portion 7c (refer to FIG. 2).

The front end depending wall 2f and the rear end upstanding wall 1f are located with a predetermined interval therebetween and in such a way as to allow the front end flange 2h to fit on the upper surface 1e of the front floor panel 1 and at the same time the rear end upstanding wall 1g to fit on the lower surface 2l of the rear floor panel 2, whereby to constitute a box-like closed sectional portion 8 which extends throughout the width of the front floor panel 1, thus joining the front floor panel 1 and the rear floor panel 2 integrally and rigidly and assembling the same into the floor assembly B. The floor assembly B is then painted and equipped with devices, components and upholsteries as a shift lever unit 9, front seats 10, rear seat 11, rear axle unit 12, spare tire (not shown), carpet (not shown), etc.

The rear end assembly C includes a rear end main body 20. The rear end main body 20 has at the lower end thereof a plurality of bolt holes 21 arranged in an array extending in the vehicle width direction. After painting, the rear end main body 20 is outfitted at the laterally opposed end portions thereof with a rear combination lamp unit 22 and at the inner side surface thereof with upholsteries as trim members (not shown), etc. The rear end assembly C is laid upon or abuttingly engaged with the rear end part of the flange 2c of the rear floor panel 2 as shown in FIG. 6. Bolts 23 are inserted into the bolt holes 21 of the rear end main body 20 and screwed into the threaded portions 4 of the flange 2c, whereby to join the rear end assembly C and the floor assembly B together.

The body side assemblies D each include various pillars as a side sill 30, front pillar 31, center pillar 32, rear pillar 33, etc. and further include a rear fender 34, roof side rail 35 and a rear wheel house 36. The side sill 30 has a box-like closed section and extends in the fore-and-aft direction of the vehicle body. The front pillar 31 extends upwardly and rearwardly from the forward end portion of the side sill 30 whilst the center pillar 32 extends upwardly from the longitudinally intermediate portion of the side sill 30. A rear fender 34 is located downwardly and rearwardly of the center pillar 32 to cooperate with body side inner panel 37 to constitute a vehicle body portion of a box-like closed section. The rear pillar 33 extends upwardly and forwardly from the rear end portion of the rear fender 34. The roof side rail 35 extends between the upper ends of the front pillar 31 and the rear pillar 33 via the upper end of the center pillar 32 and is connected to same. The center pillar 32, rear fender 34, rear pillar 33 and the roof side rail 35 are adapted to define an opening in which a window glass 38 is installed after painting of the body side assembly D. The rear end portion of the side sill 30 covered by the rear fender 34 is abuttingly joined with the front end of the rear wheel house 36. The rear wheel house 36 has a strut holder 39 projecting inwardly of the vehicle cabin. A rear strut 40 is installed on the strut holder 39 after painting of the body side assembly D. A plurality of bolt holes 41 are provided to extend through the lower flange of the side sill 30 and the lower peripheral end portions of the body side inner panel 37 and the rear wheel house 36. The rear fender 34 has at the rear end thereof a bracket 42 projecting laterally inwardly of the vehicle body.

Figure 10:
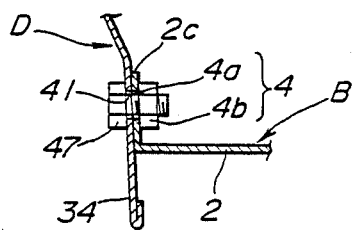
Figure 11:
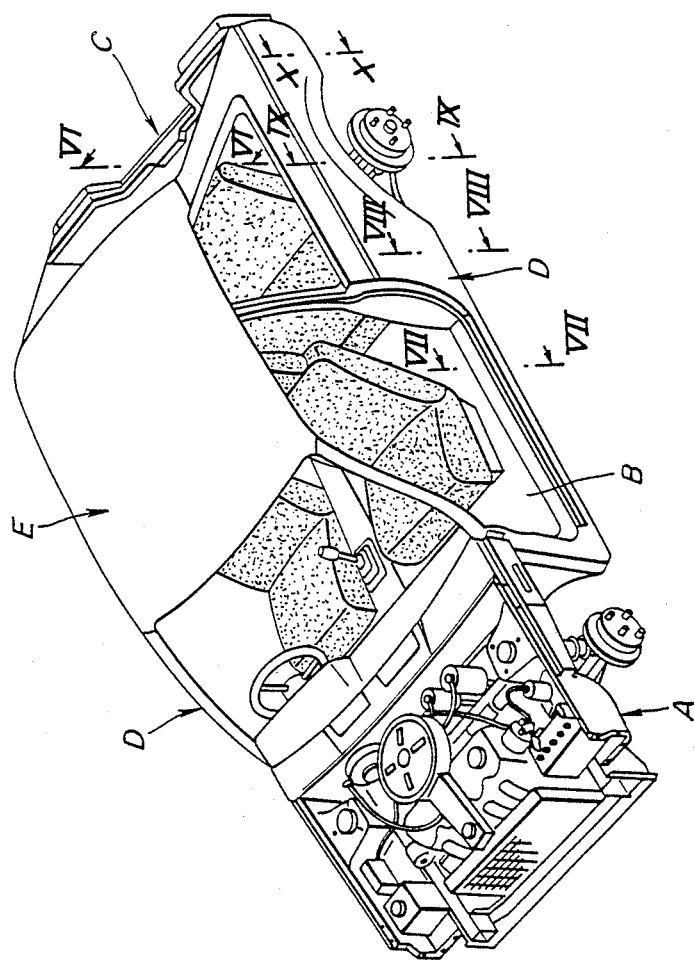
FIG. 11 is the modular vehicle body in an assembled state in which the floor structure of FIG. 1 is incorporated.

The body side assemblies D are joined or attached at the lower flanges 30a and 30a to the flanges 1b and 1b of the front floor panel 1 with bolts 43 screwed through the bolt holes 41 into the threaded portions 3 by access thereto from the laterally outside of the vehicle body as shown in FIG. 7. At the same time, the body side inner panel 37 is attached to the flange 2c of the rear floor panel 2 with bolts 45 screwed through the bolt holes 41 into the threaded portions 4 by access thereto through access holes 44 as shown in FIG. 8. The rear peripheral end portion of the rear fender 34 is attached to the flange 2c of the rear floor panel 2 with bolts 47 screwed through the bolt holes 41 into the joining hole portions 4 as shown in FIG. 10. The bracket 42 of the rear fender 34 is attached to the laterally opposed ends of the rear end assembly C with bolts though not shown. The lower end portion of the strut 40 is attached to the rear axle unit 12 of the floor assembly. In the above manner, the body side assemblies D are joined to the floor assembly B and the rear end assembly C to constitute an integral unit which is thereafter joined with the engine compartment assembly A and the roof assembly E to constitute the nearly complete vehicle body as shown in FIG. 11. The vehicle body is then furnished with the aforementioned engine hood, windshield glass, front doors, back door, etc. to be completed.

In the foregoing, it is to be noted that the flanges 2c and 2i of the rear floor panel 2 and the o flanges 1b and 1h of the front floor panel 1 are adapted to cooperate with the patch plates 5, 6 and 7 to constitute a smooth, continuous joining surface to which the joining surfaces of the body side assembly D and the rear end assembly C are joined with sealant adhesive S interposed therebetween, whereby the floor assembly B can be joined with the body side assembly D and the rear end assembly C with an assured, highly reliable seal therebetween.

From the foregoing, it will be understood that since the sealant adhesive S can be applied to the joining surfaces of the floor assembly B, body side assemblies D and the rear end assembly C prior to assemblage thereof, a seal of the vehicle body can be attained with ease and efficiency, thus resulting in a reduced assembling expense.

It is further to be noted that since the flange 2c of the rear floor panel 2 is adapted to extend in one direction, it makes it possible to form the flange 2c by metal stamping or pressing, thus resulting in a reduced manufacturing expense.

What is claimed is:

1. A floor structure for a modular vehicle body having a body side assembly, comprising:
   a front floor panel having a first flange for joining with the body side assembly;
   a rear floor panel having a second flange for joining with the body side assembly; and
   a patch plate extending between said first and second flanges to interconnect the same;
   in which said first and second flanges are formed with first and second recesses, respectively; and
   in which said patch plate is fitted in said first and second recesses and cooperates with said first and second flanges to form a smooth, continuous joining surface.

2. A floor structure as set forth in claim 1 wherein said front floor panel has at the rear end thereof an upstanding rear end wall that is joined at the upper end thereof with the lower surface of said rear floor panel, said rear floor panel having at the front end thereof a depending front end wall that is disposed forwardly of said upstanding rear end wall with a predetermined interval therebetween and joined at the lower end thereof with the upper surface of said front floor panel such that the rear end of said front floor panel and the front end of said rear floor panel are joined to constitute a floor portion of a box-like closed section, said floor portion extending throughout the width of said front floor panel.

3. A floor structure as set forth in claim 2 wherein said first flange is provided to one lateral end of said front floor panel to depend downwardly therefrom and is formed with said first recess in the place spaced forwardly from the rear end thereof, said second flange being provided to one lateral end of said depending front end wall of said rear floor panel and formed at the lower end portion thereof with said second recess, said patch plate having an L-like shape and having an upper plate portion fitted in said second recess and a lower plate portion fitted in said first recess in such a way as to have an outer surface that is substantially flush with the outer surfaces of said first and second flanges.

4. A floor structure as set forth in claim 3, further having a second patch plate, said upstanding rear end wall of said front floor panel having at one lateral end thereof a third flange for joining with the body side assembly, said third flange being formed at the lower end portion thereof a third recess, said first flange of said front panel being formed at the rear end portion thereof a fourth recess, said second patch plate being fitted in said third and fourth recesses in such a way as to have an outer surface that is substantially flush with the outer surfaces of said first and third flanges.

5. A floor structure as set forth in claim 4 wherein said rear floor panel is nearly rectangular and has a continuous upstanding fourth flange extending upwardly from the opposed lateral ends and the rear end thereof for joining with the body side assembly and another body side assembly and a rear end assembly of the modular vehicle body.

6. A floor structure as set forth in claim 5 further comprising a third patch plate, said fourth flange having at one of the laterally opposed forward end portions thereof a fifth recess, said second flange having at the upper end portion thereof a sixth recess, said rear floor panel being wider than said front floor panel and having at one of the laterally opposed front end portions thereof a seventh recess receding upwardly from the lower surface of said rear floor panel, said patch plate being of a crank-like cross section and having an upstanding plate portion, a horizontal plate and a depending wall portion respectively fitted in said fifth, seventh and sixth recesses in such a way as to have an outer surface substantially flush with the outer surfaces of the second and fourth flanges and the lower surface of said rear floor panel.

* * * * *